(12) United States Patent
Tandon

(10) Patent No.: US 10,097,400 B1
(45) Date of Patent: Oct. 9, 2018

(54) APPARATUS, SYSTEM, AND METHOD FOR DISTRIBUTING MANAGEMENT DATA TO NETWORK MANAGEMENT STATIONS

(71) Applicant: Juniper Networks, Inc., Sunnyvale, CA (US)

(72) Inventor: Abhinav Tandon, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 390 days.

(21) Appl. No.: 14/733,310

(22) Filed: Jun. 8, 2015

(51) Int. Cl.
*G06F 17/30* (2006.01)
*H04L 12/24* (2006.01)

(52) U.S. Cl.
CPC .... *H04L 41/0213* (2013.01); *G06F 17/30377* (2013.01); *G06F 17/30545* (2013.01); *G06F 17/30864* (2013.01); *H04L 41/0286* (2013.01)

(58) Field of Classification Search
CPC ......... G06F 17/30377; G06F 17/30545; G06F 17/30864
See application file for complete search history.

(56) References Cited

U.S. PATENT DOCUMENTS

| | | | |
|---|---|---|---|
| 5,751,964 A | 5/1998 | Ordanic et al. | |
| 6,076,107 A | 6/2000 | Chen et al. | |
| 7,606,884 B2 | 10/2009 | Palmer et al. | |
| 7,716,355 B2* | 5/2010 | McCloghrie | H04L 41/0233 709/202 |
| 7,734,761 B2 | 6/2010 | Jai et al. | |
| 7,797,409 B1 | 9/2010 | Secer | |
| 2006/0172742 A1* | 8/2006 | Chou | H04L 41/0213 455/450 |
| 2006/0235971 A1* | 10/2006 | McCloghrie | H04L 41/0233 709/225 |
| 2007/0192406 A1* | 8/2007 | Frietsch | G06F 1/3209 709/203 |
| 2009/0103916 A1* | 4/2009 | Dolan, III | H04L 41/0213 398/9 |
| 2011/0148587 A1* | 6/2011 | Eun | H04L 41/0213 340/10.1 |
| 2011/0289181 A1 | 11/2011 | Sankaran | |
| 2014/0101308 A1 | 4/2014 | Wanser et al. | |

OTHER PUBLICATIONS

Abhinav Tan Don; Apparatus, System, and Method for Distributing Management Data in Multi-NMS Environments; U.S. Appl. No. 14/710,633, filed May 15, 2015.

* cited by examiner

*Primary Examiner* — Loc Tran
(74) *Attorney, Agent, or Firm* — FisherBroyles, LLP

(57) ABSTRACT

The disclosed apparatus may include (1) a database that stores management data as a set of subtrees and (2) a processing unit having access to the database, wherein the processing unit (A) receives, from an NMS included in a network, a request for at least a portion of the management data, (B) identifies, based at least in part on the request, a subtree within the set of subtrees of management data stored in the database, (C) retrieves all of the management data included in the identified subtree from the database, and then (D) provides all of the management data included in the identified subtree to the NMS that initiated the request for the portion of management data without necessitating another request for any other portion of the management data included in the identified subtree. Various other apparatuses, systems, and methods are also disclosed.

17 Claims, 11 Drawing Sheets

Apparatus
100

| | | | | MIB Tree | | | |
| | | | | 500 | | | |

| NMS | OID-Subtree | Start-Response ID | End-Response ID | Max OIDs per Response | Rollover Counter | Last-Response ID | Status |
|---|---|---|---|---|---|---|---|
| 10.10.10.10 | 1.3.6.1.2.1 | 1 | 100 | 50 | 0 | 0 | Created |
| 20.20.20.20 | 1.3.6.1.4.5 | 500 | 800 | 30 | 2 | 0 | Ongoing |
| ⋮ | ⋮ | ⋮ | ⋮ | ⋮ | ⋮ | ⋮ | ⋮ |

FIG. 5

Response
800

```
**********************************************

Response-PDU
Source:      10.216.202.51
Destination: 10.10.10.10
Version:     SNMPv2
Request_id:  2
ErrorStatus = NoError
ErrorIndex = 0

OID: 1.3.6.1.2.51
    type: OctetString
    value: "ge-0/0/0"
    HEX: 64 6c 73 2d 6f 6c 72

```
                        Trap Response
                            900

------------------------------------------------------------------
**************************************************

V2 Trap

Source:      10.216.202.51
Destination: 10.10.10.10
Version:     SNMPv2

OID: 1.3.6.1.2.26
        type: OctetString
        value: "end of subtree"

APPARATUS, SYSTEM, AND METHOD FOR DISTRIBUTING MANAGEMENT DATA TO NETWORK MANAGEMENT STATIONS

BACKGROUND

In a Simple Network Management Protocol (SNMP) deployment, a Network Management Station (NMS) may poll a network device (such a router or switch) for management data related to the network device's performance and/or health. To facilitate this polling process, the NMS traditionally performs a discovery operation to enumerate the various objects included in the management data of the network device. Unfortunately, the management data may be fluid and/or dynamic in nature. As a result, the NMS may need to perform such a discovery operation on a fairly regular basis (e.g., once a day) to account for objects that have recently been added to or removed from the management data. Upon completion of the discovery operation, the NMS may be able to poll the network device for certain individual objects in which the NMS is interested.

Unfortunately, this traditional discovery and polling relationship may have certain shortcomings and/or inefficiencies. For example, traditional discovery operations and polling processes may be relatively time-consuming and/or resource intensive. As an example, a traditional discovery operation may necessitate two separate communications (e.g., a request from the NMS and a response from the network device) for each object included in the management data. In this traditional discovery operation, the separate communications for each object may need to be performed one by one in a serial fashion to discover all of the objects in the management data. As a result, to fully enumerate the various objects included in the management data, the traditional discovery operation may take a relatively long time to complete and/or place a heavy processing burden on the NMS and/or the network device.

As another example, to facilitate discovery of all the objects included in the management data, the network device may need to maintain, collect, and/or report the management data in some sort of lexicographical order. However, the network device may add a new object to and/or remove an obsolete object from the management data at any given moment due to the fluid and/or dynamic nature of the management data. As a result, the network device may need to allocate and/or invest significant resources to preserve the lexicographical ordering when reporting the management data to the NMS. For example, the network device may need to continuously re-aggregate and/or re-assemble its management data so as to correctly report the lexicographically-next object included in the management data during a discovery operation.

In a traditional polling process, the NMS may need to identify and/or request a portion of management data using one or more Object IDentifiers (OIDs) corresponding to the requested portion of management data. Unfortunately, this traditional polling process may involve reporting, in a single response to the NMS, each object included in the requested portion of management data. As a result, this traditional polling process may dictate and/or limit how or where each object is reported in the response and/or prevent the network device from reporting an arbitrarily large set of management data to the NMS without corresponding polling requests.

The instant disclosure, therefore, identifies and addresses a need for additional and improved apparatuses, systems, and methods for distributing management data to NMSes.

SUMMARY

As will be described in greater detail below, the instant disclosure generally relates to apparatuses, systems, and methods for distributing management data to NMSes. In one example, an apparatus for accomplishing such a task may include (1) a database that stores management data (e.g., SNMP management data) as a set of subtrees and (2) a processing unit having access to the database, wherein the processing unit (A) receives, from an NMS included in a network, a request for at least a portion of the management data, (B) identifies, based at least in part on the request, a subtree within the set of subtrees of management data stored in the database, (C) retrieves all of the management data included in the identified subtree from the database, and then (D) provides all of the management data included in the identified subtree to the NMS that initiated the request for the portion of management data without necessitating another request for any other portion of the management data included in the identified subtree.

Similarly, a router incorporating the above-described apparatus may include (1) a Management Information Base (MIB) tree that stores management data as a set of subtrees and (2) a processing unit communicatively coupled to the storage device, wherein the processing unit (A) receives, from an NMS included in a network, a request for at least a portion of the management data, (B) identifies, based at least in part on the request, a subtree within the set of subtrees of management data stored in the MIB tree, (C) retrieves all of the management data included in the identified subtree from the MIB tree, and then (D) provides all of the management data included in the identified subtree to the NMS that initiated the request for the portion of management data without necessitating another request for any other portion of the management data included in the identified subtree.

A corresponding method may include (1) receiving, from an NMS included in a network, a request for at least a portion of management data that is stored in a database as a set of subtrees, (2) identifying, based at least in part on the request, a subtree within the set of subtrees of management data stored in the database, (3) retrieving, upon identifying the subtree, all of the management data included in the identified subtree from the database, and then (4) providing all of the management data included in the identified subtree to the NMS that initiated the request for the portion of management data without necessitating another request for any other portion of the management data included in the identified subtree.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 5 is an illustration of an exemplary MIB tree included in a database that stores management data.

FIG. 8 is an illustration of a further exemplary response initiated in reply to a request for a portion of management data.

FIG. 9 is an illustration of an exemplary trap response marking the completion of a data transfer of a subtree.

Figure 1:
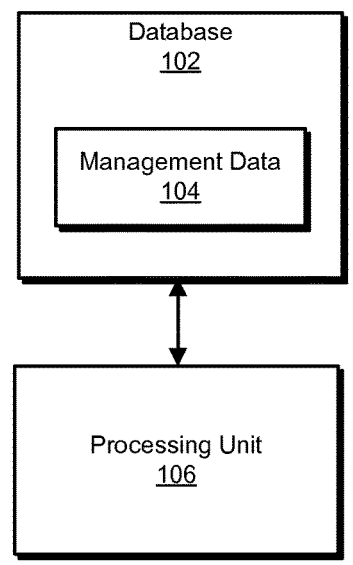
FIG. 1 is a block diagram of an exemplary apparatus for distributing management data to NMSes.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various apparatuses, systems, and methods for distributing management data to NMSes. The term "network management station" or the abbreviation "NMS," as used herein, generally refers to any type or form of physical or virtual system and/or device that monitors, manages, and/or controls network devices (such as routers, switches, gateways, and/or servers) within a network.

As will be explained in greater detail below, embodiments of the instant disclosure may create and/or maintain a set of subtrees that include management data of interest to one or more NMSes within an SNMP network. For example, an NMS may notify a network device of certain management data that the NMS is interested in polling based on an OID of the root object within that management data. In response to this notification from the NMS, the network device may set and/or create, within a MIB tree, a table entry that includes a subtree of OIDs rooted by the OID identified in the notification. The network device may then transfer and/or report all of the management data identified by the OIDs included in the subtree to the NMS.

Accordingly, by creating and/or maintaining the set of subtrees in this way, these embodiments may enable the network device to transfer all of the management data identified in a subtree to the NMS in response to a single SNMP request. For example, embodiments of the instant disclosure may enable the network device to generate multiple SNMP responses in reply to a single SNMP request and then send those SNMP responses to the NMS (instead of generating and sending only one SNMP response for each SNMP request). By generating and sending multiple SNMP responses in this way, the network device may reduce its own processing burden as well as the processing burden on the NMS.

Additionally or alternatively, embodiments of the instant disclosure may eliminate the need for maintaining, collecting, and/or sending the management data in any sort of lexicographical order. For example, since the network device is able to transfer all of the management data identified in the subtree to the NMS that initiated the single request, the order in which the network device sends that management data to the NMS may no longer be of much importance. By eliminating the need for maintaining, collecting, and/or sending the management data in any sort of lexicographical order, these embodiments may reduce the processing burden placed on the network device.

Additionally or alternatively, embodiments of the instant disclosure may eliminate the need for separate discovery and polling processes. For example, since the network device is able to transfer all of the management data identified in the subtree to the NMS that initiated the single polling request, the NMS may no longer need to discover, identify, and/or request each individual object included in the pertinent management data. Instead, the NMS may simply initiate a single request for the subtree that includes the management data of interest to the NMS and then receive that management data in a series of responses triggered by the single request. Moreover, since the NMS no longer needs to discover all of the individual objects included in the management data of interest in order to obtain those objects during a polling operation, these embodiments may enable the NMS to obtain such objects in a polling operation as soon as they are added to the subtree that includes the management data of interest (instead of having to wait for the completion of the next discovery operation).

The following will provide, with reference to FIG. 1, examples of apparatuses that facilitate distribution of management data to NMSes. The discussion corresponding to FIG. 3 will provide detailed descriptions of an exemplary implementation of the apparatus from FIG. 1. The discussions corresponding to FIGS. 2, 4, and 5 will provide detailed descriptions of an exemplary database, an exemplary request for a subtree of management data, and an exemplary MIB tree that assists in facilitating distribution of that management data, respectively. The discussions corresponding to FIGS. 6, 7, 8, and 9 will provide detailed descriptions of an exemplary response to the request from FIG. 4, another exemplary response to the same request, a further exemplary response to the same request, and an exemplary trap response marking the completion of a data transfer of the subtree, respectively. The discussion corresponding to FIG. 10 will provide a detailed description of an exemplary method for distributing management data to NMSes. Finally, the discussion corresponding to FIG. 11 will provide numerous examples of systems that may incorporate the apparatus from FIG. 1.

FIG. 1 shows a block diagram of an exemplary apparatus 100 for distributing management data to NMSes. Apparatus 100 generally represents any type or form of system, device, and/or mechanism that facilitates distribution of management data to NMSes. Examples of apparatus 100 include network devices, routers, switches, hubs, modems, bridges, repeaters, gateways, multiplexers, network adapters, portions of one or more of the same, variations of one or more of the same, combinations of one or more of the same, or any other suitable apparatus.

As shown in FIG. 1, apparatus 100 may include a processing unit 106 with access to and/or in communication with a database 102. The term "processing unit," as used herein, generally refers to any type or form of physical hardware, circuit, device, and/or processor that performs certain Input/Output (I/O) operations and/or computing tasks directed to distributing and/or providing management data to NMSes. In one example, processing unit 106 may represent an integrated circuit whose configuration and/or infrastructure is at least partially fixed. Additionally or alternatively, processing unit 106 may represent an integrated circuit whose configuration and/or infrastructure is at least partially variable and/or programmable. Examples of processing unit 106 include, without limitation, processors, microprocessors, microcontrollers, Central Processing Units (CPUs), Field-Programmable Gate Arrays (FPGAs), Application-Specific Integrated Circuits (ASICs), software modules installed on one or more of the same, portions of one or more of the same, variations of one or more of the same, combinations of one or more of the same, or any other suitable processing unit.

Database 102 generally represents any type or form of organized collection of data. In one example, database 102 may include and/or represent all or a portion of data stored on a storage device included in apparatus 100 or one or more other network devices (not necessarily illustrated in FIG. 1 or 2). Accordingly, although database 102 is illustrated as part of apparatus 100 in FIG. 1, database 102 may alternatively include and/or represent data stored in a network device (not illustrated in FIG. 1 or 2) in communication with apparatus 100. For example, apparatus 100 may operate as an SNMP proxy that includes an SNMP agent. In this example, the SNMP agent may manage, access, and/or modify database 102 maintained and/or stored on a remote network device.

Figure 2:
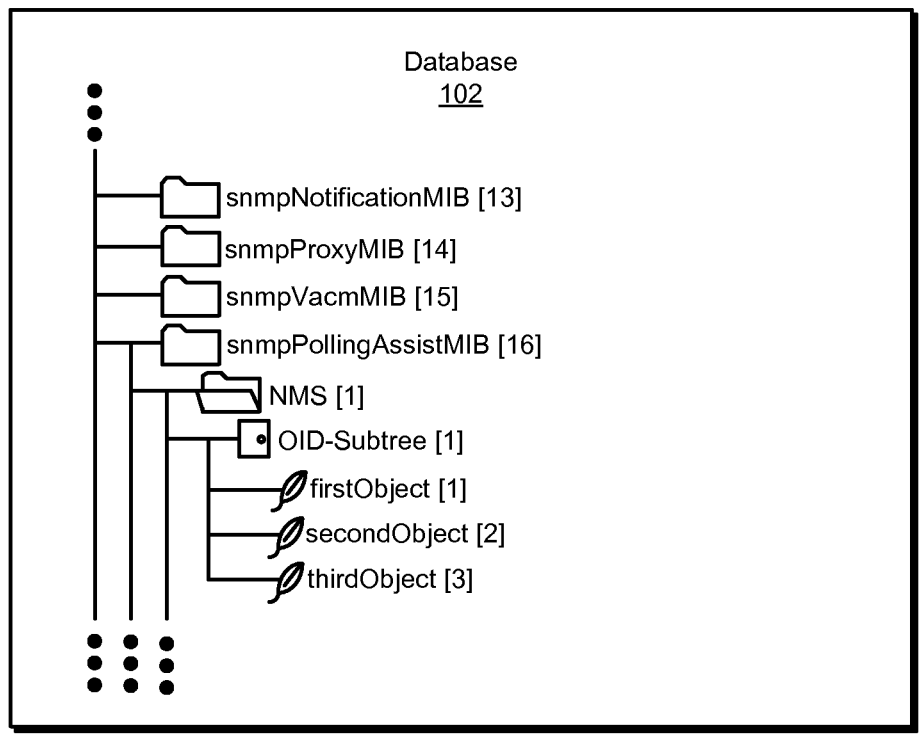
FIG. 2 is an illustration of an exemplary database that stores management data.

In another example, database 102 may include and/or represent all or portions of data stored across multiple storage devices included in apparatus 100 or one or more network devices (not necessarily illustrated in FIG. 1 or 2). Examples of such storage devices include, without limitation, Hard Disk Drives, (HDDs), Solid-State Drives (SSDs), flash drives, Random-Access Memory (RAM) devices, caches, virtual storage devices, variations of one or more of the same, combinations of one or more of the same, or any other suitable storage devices.

In one example, database 102 may be organized and/or formatted as one or more tree data structures and/or MIBs. In this example, the data (such as management data 104 in FIG. 1) stored in database 102 may be searchable by an OID. In other words, the key to database 102 may include and/or represent the OID of the object being searched. As an example, the OID may represent a key that points and/or leads to an object identified in a subtree stored in database 102. Additionally or alternatively, the OID may represent a key that points and/or leads to the subtree itself.

In another example, database 102 may not necessarily be organized and/or formatted internally to the network device (e.g., apparatus 100 or another network device) on which database 102 is located. However, in this example, database 102 may appear and/or be presented externally to remote network devices in an organized and/or formatted view or configuration (such as a MIB tree or collection of MIB trees).

In one example, database 102 may maintain and/or store management data as a set of subtrees indexed at least in part by OIDs. For example, database 102 may include and/or represent a MIB tree created specifically for assisting in polling operations. In this example, the MIB tree may include and/or store a set of subtrees that include OIDs for management data 104 of interest to one or more NMSes within a network (such as network 304 in FIG. 3). Each of these subtrees may include and/or store multiple OIDs of objects that represent and/or constitute management data (such as management data 104 in FIG. 1). Additionally or alternatively, each of these subtrees may include and/or store the objects themselves.

As shown in FIG. 1, database 102 may include and/or store management data 104. The term "management data," as used herein, generally refers to any type or form of data, information, and/or statistics related to an apparatus included in a network. Database 102 may store management data 104 in connection with a network protocol implemented within a network (such as network 304 in FIG. 3). For example, database 102 may store data, information, and/or statistics pertinent to the SNMP protocol implemented and/or deployed in the network. In this example, management data 104 may include and/or represent SNMP management data and/or SNMP objects.

In one example, management data 104 may include and/or represent statistics information about network traffic handled by and/or passing through apparatus 100. For example, management data 104 may identify the amount of network traffic handled by and/or passing through apparatus 100. Additionally or alternatively, management data 104 may include and/or represent performance and/or health information related to apparatus 100. For example, management data 104 may identify the amount of processing power used by apparatus 100 over a certain period of time and/or the number of data packets received and/or forwarded by apparatus 100 over a certain period of time.

In another example, management data 104 may indicate whether apparatus 100 has experienced any type or form of failure and/or security attack during a certain period of time. Accordingly, examples of management data 104 include, without limitation, fault information, configuration information, accounting information, administrative information, performance information, health information, security information, OIDs of one or more of the same, variations of one or more of the same, combinations of one or more of the same, or any other suitable management data.

In some examples, management data 104 may be arranged and/or collected as a set of subtrees within a MIB tree included in database 102. In one example, each of these subtrees within the MIB tree may include and/or identify a different set of OIDs for management data of interest. For example, one of these subtrees within the MIB tree may include and/or identify OIDs of interest to a specific NMS (such as NMS 306(1) in FIG. 3) within the network. In this example, another one of these subtrees within the MIB tree may include and/or identify OIDs of interest to another NMS (such as NMS 306(N) in FIG. 3) within the network.

As a specific example, FIG. 2 shows an illustration of an exemplary view of database 102. As shown in FIG. 2, database 102 may include a plurality of MIB trees (in this example, "snmpNotificationMIB [13]," "snmpProxyMIB [14]," "snmpVacmMIB [15]," and "snmpPollingAssistMIB [16]"), a node that identifies a specific NMS within an expanded MIB tree (in this example, "NMS [1]"), a subtree of OIDs of interest to that NMS (in this example, "OID-Subtree [1]"), and various objects of SNMP management data included in that subtree (in this example, "firstObject [1]," "secondObject [2]," and "thirdObject [3]").

In some examples, processing unit 106 may be communicatively coupled to a storage device that includes database 102. In such examples, processing unit 106 may receive a request for a portion of management data 104 from an NMS included in a network. In one example, this request may include and/or represent an SNMP "SET" request. In another example, this request may include and/or represent an SNMP "GET" or "GET-NEXT" request.

In response to receiving the request from the NMS, processing unit 106 may identify a subtree within the set of subtrees of management data stored in database 102 based at least in part on the request. Upon identifying the subtree in database 102, processing unit 106 may retrieve all of the management data identified in the subtree. Processing unit 106 may then provide all of the management data identified in the subtree to the NMS that initiated the request for the portion of management data 104.

Figure 3:
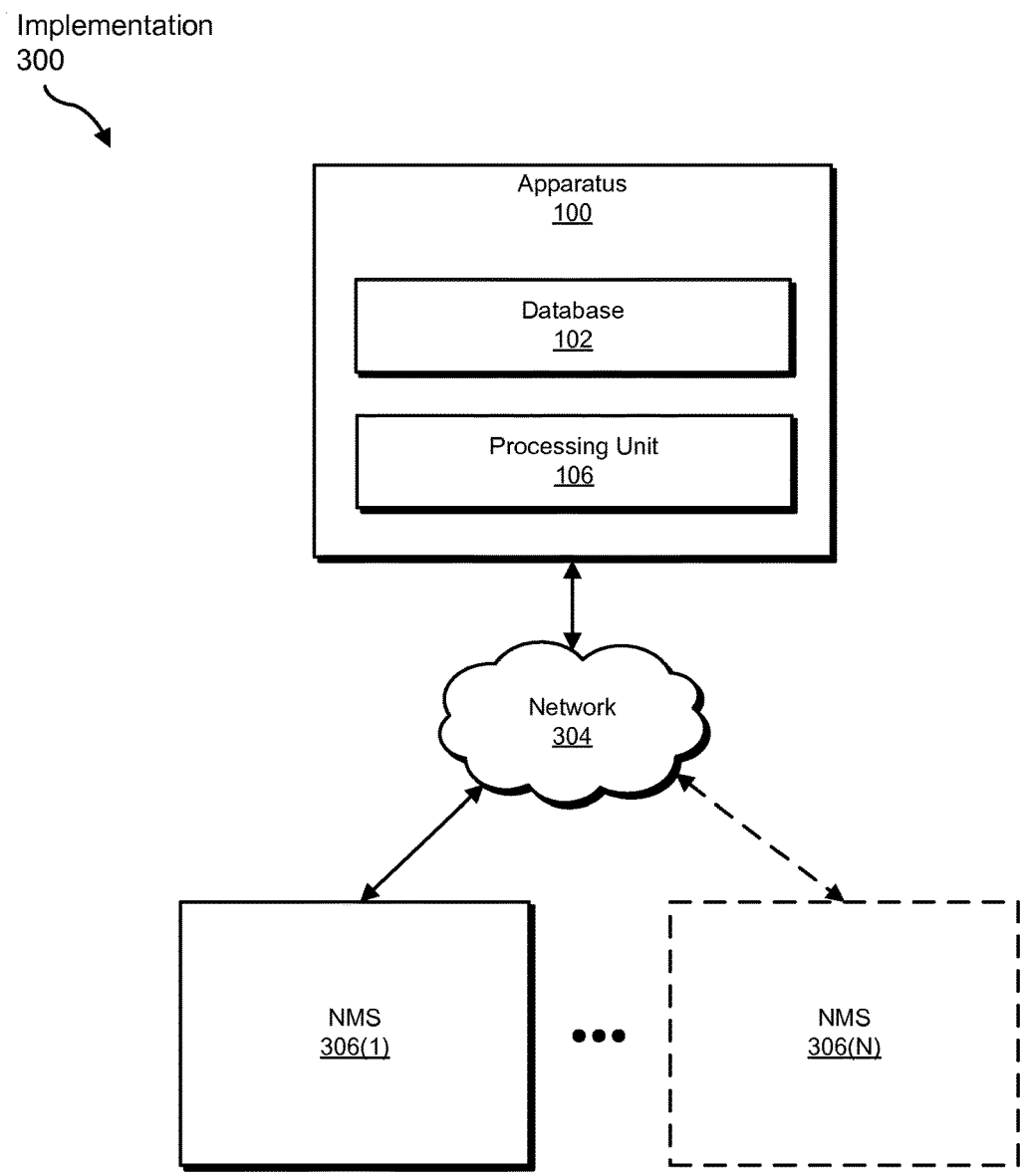
FIG. 3 is a block diagram of an exemplary implementation of an apparatus for distributing management data to NMSes.

FIG. 3 shows a block diagram of an exemplary implementation 300 of apparatus 100 for distributing management data to NMSes. As illustrated in FIG. 3, implementation 300 may include apparatus 100 in communication with NMSes 306(1)-(N) via a network 304. The term "network," as used herein, generally refers to any type or form of medium and/or architecture that facilitates communication or data transfer. In one example, network 304 may include and/or represent a plurality of computing devices.

Examples of network 304 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations of one or more of the same, combinations of one or more of the same, or any other suitable network. Network 304 may facilitate communication or data transfer using wireless or wired connections. Although apparatus 100 and NMSes 306(1)-(N) are illustrated as being external to network 304 in FIG. 3, apparatus 100 and/or one or more of NMSes 306(1)-(N) may alternatively represent portions of network 304 and/or be included in network 304.

In some examples, NMS 306(1) may initiate a request to create a table or row in a MIB tree that assists in polling operations (hereinafter referred to as the "polling-assist MIB"). For example, NMS 306(1) may generate an SNMP "SET" request configured to create a table or row in the polling-assist MIB. In this example, the SNMP "SET" request may direct and/or apparatus 100 and/or processing unit 106 to create a table or row corresponding to NMS 306(1) in the polling-assist MIB. In addition, the SNMP "SET" request may define a subtree to be populated in that table or row corresponding to the NMS 306(1) in the polling-assist MIB. This subtree may include and/or identify various OIDs of objects included in management data 104. Additionally or alternatively, this subtree may include and/or identify the objects themselves.

In one example, the SNMP "SET" request may define various other attributes of the MIB table or row corresponding to the subtree and/or various attributes of polling operations involving the subtree. Examples of such attributes include, without limitation, the requesting NMS's Internet Protocol (IP) address, an OID of the subtree, OIDs of one or more objects to be included in the subtree, a start-response ID to be used as the identifier marking the start of a series of responses sent to the NMS in reply to a corresponding polling request, an end-response ID to be used as the identifier marking the end of a series of responses sent to the NMS in reply to a corresponding polling request, the maximum number of OIDs and/or objects to be included in each response sent to the NMS during a polling operation, variations of one or more of the same, and/or any other suitable attributes.

Figure 4:
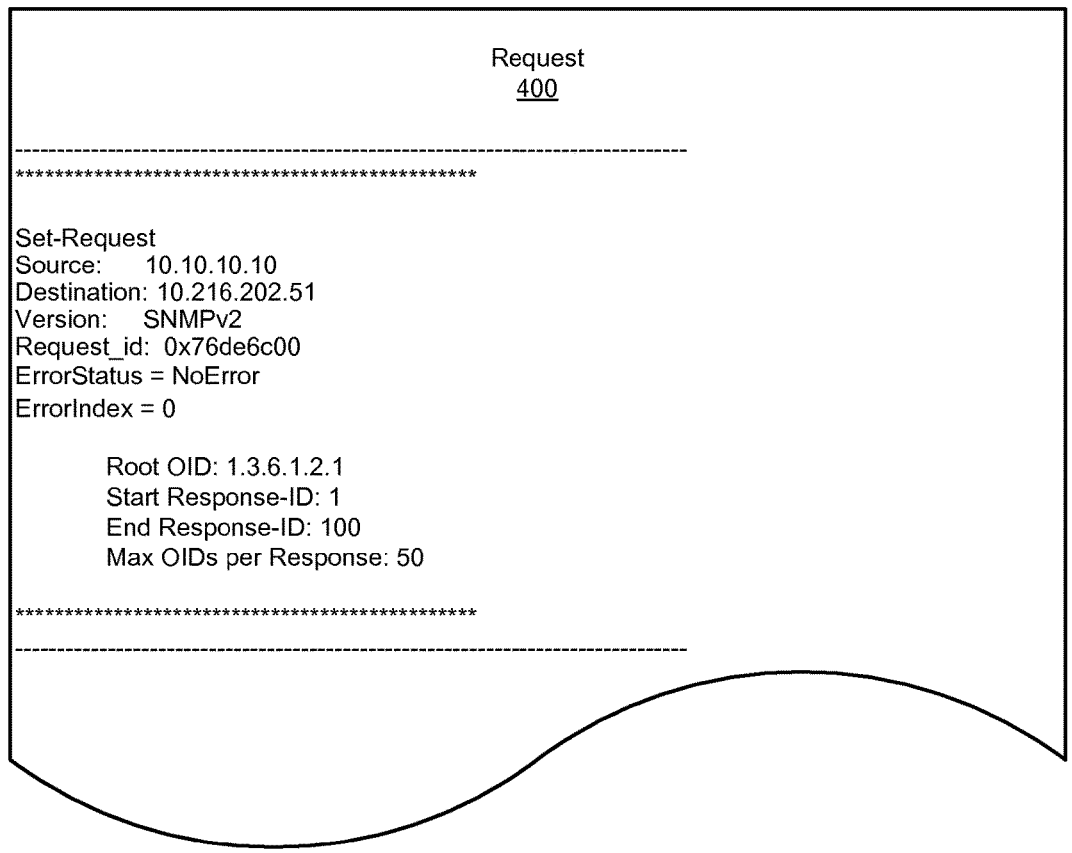
FIG. 4 is an illustration of an exemplary request for a portion of management data.

As a specific example, NMS 306(1) may initiate a request 400 in FIG. 4 to create a table or row within a MIB tree 500 in FIG. 5. As illustrated in FIG. 4, request 400 may identify the request type (in this example, "Set-Request"), the IP address of the source device (in this example, "10.10.10.10"), the IP address of the destination device (in this example, "10.216.202.51"), the network protocol version (in this example, "SNMPv2"), the request identifier (in this example, "0x76de6c00"), any error indicators (in this example, "NoError" and "0"), an OID of the root object within requested subtree (in this example, "1.3.6.1.2.1"), the start-response ID to be used as the identifier marking the start of a series of responses to the request (in this example, "1"), the end-response ID to be used as the identifier marking the end of the series of responses to the request (in this example, "100"), the maximum number of OIDs and/or objects to be included in each response in the series of responses (in this example, "50").

In one example, request 400 may direct and/or cause apparatus 100 and/or processing unit 106 to create a table or row that includes the subtree of interest to NMS 306(1) within MIB tree 500. In this example, apparatus 100 and/or processing unit 106 may populate MIB tree 500 in FIG. 5 based at least in part on request 400 received from NMS 306(1) and/or a similar SNMP "SET" request received from NMS 306(N).

As illustrated in FIG. 5, MIB tree 500 may include a plurality of entries created and/or initiated by different NMSes within the network. For example, MIB tree 500 may include an entry corresponding to NMS 306(1) that identifies the IP address of NMS 306(1) (in this example, "10.10.10.10"), a subtree that includes an OID and/or object of interest to NMS 306(1) (in this example, "1.3.6.1.2.1"), the start-response ID to be used as the identifier marking the start of a series of responses sent to NMS 306(1) in reply to request 400 (in this example, "1"), the end-response ID to be used as the identifier marking the end of a series of responses sent to the NMS in reply to request 400 (in this example, "100"), the maximum number of OIDs and/or objects to be included in each response sent to NMS 306(1) during a polling operation involving the subtree (in this example, "50"), a rollover counter that keeps track of the number of times that a series of responses sent during a polling operation have cycled through the range between the start-response ID and the end-response ID (in this example, "0"), the last response ID used in the last response sent to NMS 306(1) during a polling operation involving the subtree (in this example, "0"), and the status of a polling operation involving the subtree (in this example, "Created"). In this example, the subtree identified within the entry corresponding to NMS 306(1) may include various other OIDs and/or objects that are not illustrated in MIB tree 500 in FIG. 5.

In addition, MIB tree 500 may include an entry corresponding to NMS 306(N) that identifies the IP address of NMS 306(N) (in this example, "20.20.20.20"), a subtree that includes an OID and/or object of interest to NMS 306(N) (in this example, "1.3.6.1.4.5"), the start-response ID to be used as the identifier marking the start of a series of responses sent to NMS 306(1) in reply to a corresponding polling request (in this example, "500"), the end-response ID to be used as the identifier marking the end of a series of responses sent to the NMS in reply to a corresponding polling request (in this example, "800"), the maximum number of OIDs and/or objects to be included in each response sent to NMS 306(1) during a polling operation involving the subtree (in this example, "30"), a rollover counter that keeps track of the number of times that a series of responses sent during a polling operation have cycled through the range between the start-response ID and the end-response ID (in this example, "2"), the last response ID used in the last response sent to NMS 306(1) during a polling operation involving the subtree (in this example, "0"), and the status of a polling operation involving the subtree (in this example, "Ongoing"). In this example, the subtree identified within the entry corresponding to NMS 306(N) may include various other OIDs and/or objects that are not illustrated in MIB tree 500 in FIG. 5.

In one example, processing unit 106 may generate a response to notify NMS 306(1) that the entry corresponding to NMS 306(1) has been successfully created within MIB tree 500 in response to request 400. For example, processing unit 106 may generate a response 600 in FIG. 6 that identifies certain variable bindings that have been successfully implemented based at least in part on request 400. In this example, response 600 may include and/or represent an SNMP response Packet Data Unit (PDU) (sometimes referred to as a "SET" response PDU, a "GET" response PDU, or simply a response PDU). Upon generating response 600, processing unit 106 may send response 600 to NMS 306(1) via network 304. By generating and sending response 600 in this way, apparatus 100 and/or processing unit 106 may notify NMS 306(1) of the successful creation of the table or row corresponding to NMS 306(1) within MIB tree 500 and/or to expect a series of responses containing the various OIDs and/or objects included in the requested subtree.

Figure 6:
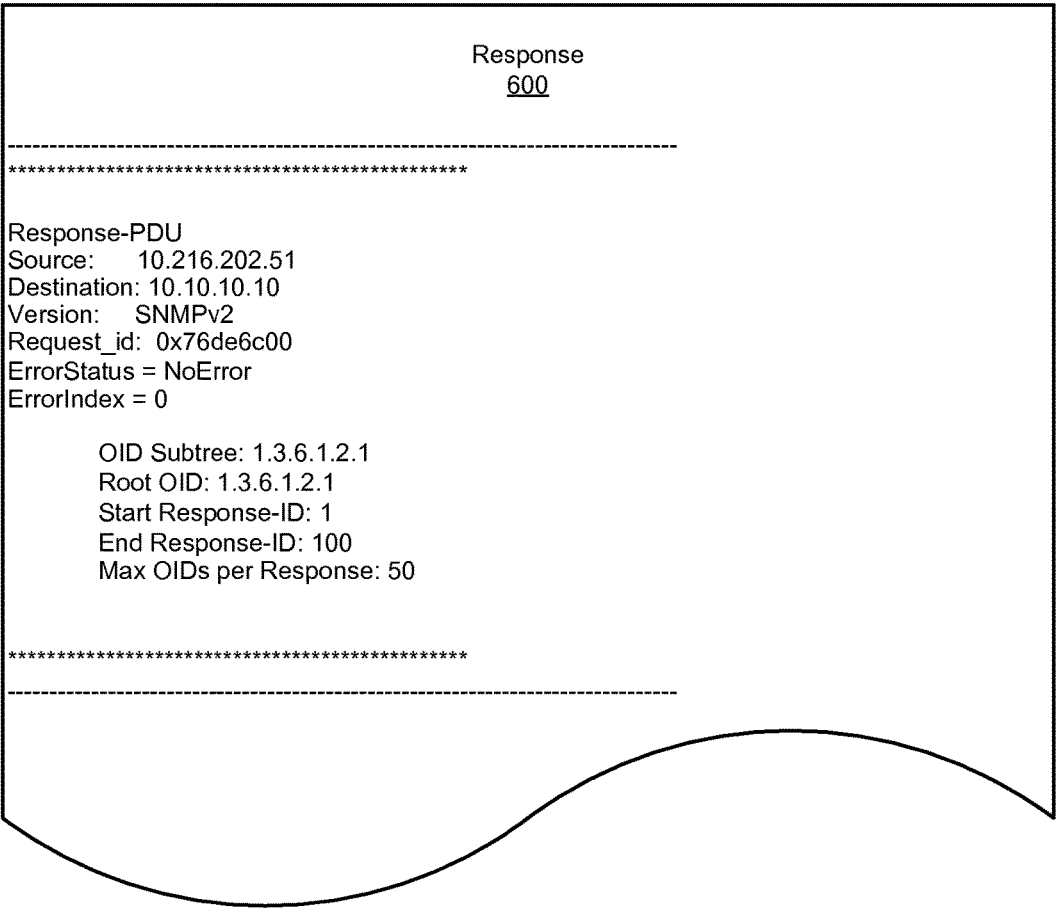
FIG. 6 is an illustration of an exemplary response initiated in reply to a request for a portion of management data.

As illustrated in FIG. 6, response 600 may identify the response type (in this example, "Response-PDU"), the IP address of the source device (in this example, "10.216.202.51"), the IP address of the destination device (in this example, "10.10.10.10"), the network protocol version (in this example, "SNMPv2"), the request identifier (in this example, "0x76de6c00"), any error indicators (in this example, "NoError" and "0"), an OID of the root object within requested subtree (in this example, "1.3.6.1.2.1"), the start-response ID to be used as the identifier marking the start of a series of responses to the request (in this example, "1"), the end-response ID to be used as the identifier marking the end of the series of responses to the request (in this example, "100"), the maximum number of OIDs and/or objects to be included in each response in the series of responses (in this example, "50").

In one example, processing unit 106 may retrieve and/or obtain all of the management data included and/or identified in the subtree from MIB tree 500 or elsewhere in database 102. For example, processing unit 106 may retrieve all of the objects (e.g., the object identified by the "1.3.6.1.2.1" OID and any other objects beneath the "1.3.6.1.2.1" OID that are not illustrated in FIG. 5) included in the subtree of interest to NMS 306(1). Additionally or alternatively, processing unit 106 may retrieve all of the objects whose OIDs are included in the subtree of interest to NMS 306(1). Processing unit 106 may then provide all of the management data identified in the subtree to NMS 306(1) without necessitating another request for any other portion of management data included in the subtree. In other words, processing unit 106 may provide all of the management data identified in the subtree to NMS 306(1) without necessitating any requests that identify the OIDs of any other objects included in the requested portion of management data. Accordingly, processing unit 106 may transfer all of the management data included in the subtree in response to a single SNMP request (e.g., request 400).

In one example, processing unit 106 may generate a plurality of responses that each contain a portion of the management data included in the subtree in response to request 400. For example, processing unit 106 may generate a response 700 in FIG. 7 that contains 50 different objects and/or OIDs identified in the subtree in accordance with the attributes of that subtree and/or the corresponding entry within MIB tree 500. In this example, response 700 may include and/or represent an SNMP response PDU. Upon generating response 600, processing unit 106 may send response 700 to NMS 306(1) via network 304.

Figure 7:
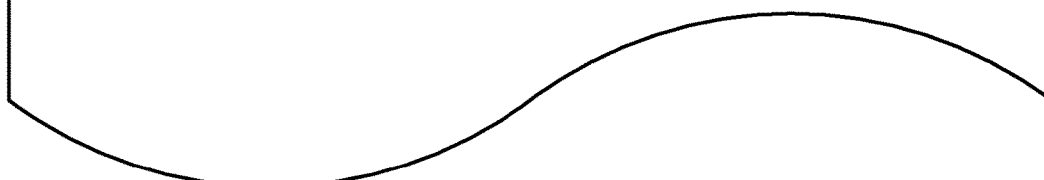
FIG. 7 is an illustration of another exemplary response initiated in reply to a request for a portion of management data.

As illustrated in FIG. 7, response 700 may identify the response type (in this example, "Response-PDU"), the IP address of the source device (in this example, "10.216.202.51"), the IP address of the destination device (in this example, "10.10.10.10"), the network protocol version (in this example, "SNMPv2"), the request identifier (in this example, "1"), any error indicators (in this example, "NoError" and "0"), OIDs of objects included in the subtree (in this example, "1.3.6.1.2.1," "1.3.6.1.2.2," and "1.3.6.1.2.3," respectively), data types of those objects (in this example, "OctetString," "OctetString," and "OctetString," respectively), the current values of those objects (in this example, "default," "_mpls-oam_," and "default-switch," respectively), and hexadecimal representations of those objects (in this example, "64 65 66 61 75 6c 74," "5f 5f 6d 70 6c 73 2d 6f," and "64 65 66 61 75 6c 74 2d," respectively). In this example, response 600 may also include and/or identify various other management data, objects, and/or OIDs that are not illustrated in FIG. 7.

Continuing with this example, processing unit 106 may generate a response 800 in FIG. 8 that contains 50 more objects and/or OIDs identified in the subtree in accordance with the attributes of that subtree and/or the corresponding entry within MIB tree 500. In this example, response 800 may include and/or represent an SNMP response PDU. Upon generating response 800, processing unit 106 may send response 800 to NMS 306(1) via network 304. Accordingly, processing unit 106 may be able to generate and send responses 700 and 800 to NMS 306(1) as triggered by request 400 without any explicit SNMP "GET" or "GET-NEXT" requests from NMS 306(1). By generating and sending multiple polling responses in reply to a single polling request in this way, apparatus 100 and/or processing unit 106 may reduce its own processing burden as well as the processing burden on NMS 306(1).

As illustrated in FIG. 8, response 800 may identify the response type (in this example, "Response-PDU"), the IP address of the source device (in this example, "10.216.202.51"), the IP address of the destination device (in this example, "10.10.10.10"), the network protocol version (in this example, "SNMPv2"), the request identifier (in this example, "2"), any error indicators (in this example, ""NoError" and "0"), an OID of an object included in the subtree (in this example, "1.3.6.1.2.51"), a data type of that object (in this example, "OctetString"), the current value of that object (in this example, "ge-0/0/0"), and a hexadecimal representation of that object (in this example, "64 6c 73 2d 6f 6c 72"). In this example, response 800 may also include and/or identify various other management data, objects, and/or OIDs that are not illustrated in FIG. 8.

In one example, processing unit 106 may generate this series of responses as triggered by request 400 only upon the successful creation of a table or row corresponding to NMS 306(1) in the polling-assist MIB. In this example, processing unit 106 may generate this series of responses in accordance with the attributes of that table or row corresponding to NMS 306(1) as well as the general SNMP guidelines and/or standards.

In one example, processing unit 106 may also generate a response 900 in FIG. 9 that marks the completion of the data transfer of the subtree to NMS 306(1). In this example, response 900 may include and/or represent an SNMP trap PDU. As illustrated in FIG. 9, response 900 may identify the notification type (in this example, "V2 Trap"), the IP address of the source device (in this example, "10.216.202.51"), the IP address of the destination device (in this example, "10.10.10.10"), the network protocol version (in this example, "SNMPv2"), an OID corresponding to an end-of-subtree marker (in this example, "1.3.6.1.2.26"), a data type of that end-of-subtree marker (in this example, "OctetString"), and the value of that end-of-subtree marker (in this example, "end of subtree").

In some examples, processing unit 106 may update certain subtrees by adding new portions of management data to those subtrees. For example, an administrator of apparatus 100 may add and/or install a new interface (such as a line card) to apparatus 100. In this example, processing unit 106 may detect the addition and/or installation of the new interface. Upon detecting the addition and/or installation of the new interface, processing unit 106 may determine that some new objects of management data need to be added to the subtree of interest to NMS 306(1) in order to account for the addition and/or installation of the new interface. Processing unit 106 may then update the subtree of interest to NMS 306(1) by adding those new objects to the subtree prior to or during a polling operation.

As a result, processing unit 106 may be able to provide the new objects to NMS 306(1) during the polling operation without necessitating another request that includes an object identifier for any of the new objects. Since processing unit 106 may provide the new objects to NMS 306(1) during the polling operation, processing unit 106 may facilitate eliminating the need for separate discovery and polling processes. In other words, since processing unit 106 is able to transfer all of the pertinent management data to NMS 306(1) in response to a single request, NMS 306(1) may no longer need to discover, identify, and/or request each individual object included in the pertinent management data. Instead, NMS 306(1) may simply initiate a single request for the subtree that includes the pertinent management data and then receive that management data in a series of responses triggered by the single request. Moreover, since NMS 306(1) no longer needs to discover all of the individual objects included in the pertinent management data in order to obtain those objects in a polling operation, processing unit 106 may be able to provide any newly added objects to NMS 306(1) in a polling operation as soon as they are added to the pertinent management data (instead of having to wait for the completion of the next discovery operation).

Since, in some examples, processing unit 106 is able to transfer all of the management data included in the subtree to NMS 306(1) in response to a single polling request, processing unit 106 may maintain, collect, and/or send the management data included in the subtrees in any order and/or without any intelligible ordering. For example, processing unit 106 may maintain the management data included in the subtree in a non-lexicographical order. Additionally or alternatively, processing unit 106 may provide the management data included in the subtree to NMS 306(1) in a non-lexicographical order. By eliminating the need for maintaining, collecting, and/or sending the management data included in the subtree in any sort of lexicographical order, processing unit 106 may reduce the processing burden placed on apparatus 100.

Figure 10:
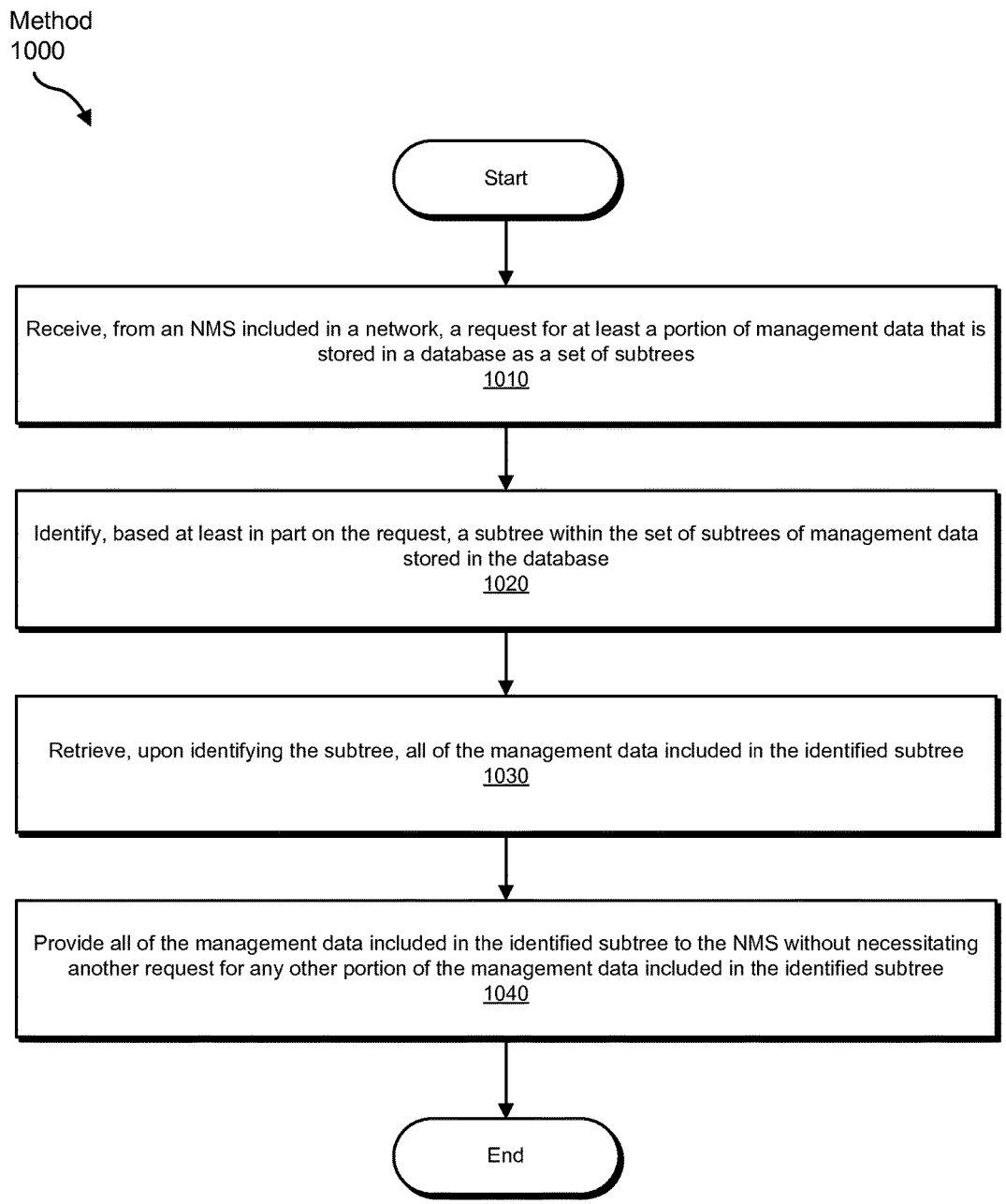
FIG. 10 is a flow diagram of an exemplary method for distributing management data to NMSes.

FIG. 10 is a flow diagram of an exemplary method 1000 for distributing management data to NMSes. Method 1000 may include the step of receiving, from an NMS included in a network, a request for at least a portion of management data that is stored in a database as a set of subtrees (1010). This receiving step may be performed in a variety of ways. For example, processing unit 106 may, as part of a router included in network 304, receive a request from NMS 306(1) for a portion of management data 104 stored in database 102. Additionally or alternatively, processing unit 106 may, as part of a switch included in network 304, receive a request from NMS 306(1) for a portion of management data 104 stored in database 102. In such examples, database 102 may include and/or represent a MIB tree that is indexed at least in part by OIDs.

Returning to FIG. 10, method 1000 may also include the step of identifying, based at least in part on the request, a subtree within the set of subtrees of management data stored in the database (1020). This identifying step may be performed in a variety of ways. For example, processing unit 106 may, as part of the router or switch, search database 102 for the requested portion of management data 104 by using one or more OIDs included in the request as the database key(s).

Returning to FIG. 10, method 1000 may additionally include the step of retrieving all of the management data included in the identified subtree (1030). This retrieving step may be performed in a variety of ways. For example, processing unit 106 may, as part of the router or switch, retrieve and/or obtain all of the management data included in the identified subtree prior to providing that management data to NMS 306(1). Additionally or alternatively, processing unit 106 may retrieve and/or obtain certain objects of the management data included in the identified subtree on an as-needed basis to generate and/or send responses that contain such objects to NMS 306(1) in reply to the request.

Returning to FIG. 10, method 1000 may further include the step of providing all of the management data included in the identified subtree to the NMS without necessitating another request for any other portion of the management data included in the identified subtree (1040). This providing step may be performed in a variety of ways. For example, processing unit 106 may, as part of the router or switch, generate a plurality of responses that collectively contain all of the objects of management data included in the identified subtree. Additionally or alternatively, processing unit 106 may send the plurality of responses that collectively contain all of the objects of management data included in the identified subtree to NMS 306(1) via network 304.

As explained above in connection with FIGS. 1-10, a network node (such as a router or switch) may be able to reduce its processing load in connection with polling operations and/or eliminate the need for separate discovery operations. For example, an NMS within an SNMP network may generate an SNMP "SET" request directed to the network node. This "SET" request may identify an OID of a root object within a subtree of management data to include in a table entry within a MIB tree of the network node. The NMS may then send this "SET" request to the network node via the SNMP network. Upon receiving the "SET" request, the network node may create a table or row within the MIB tree and/or populate this table or row with the OIDs of management data called for by the "SET" request.

This "SET" request may initiate a polling operation to poll the network node for the management data identified by the OIDs included in that table or row within the MIB tree. For example, the network node may retrieve and/or obtain the objects identified by the OIDs included in the subtree (whether those objects are stored in the subtree itself or in another database that stores the objects). Upon retrieving and/or obtaining the objects identified by the OIDs included in the subtree, the network node may provide those objects to the NMS in a series of SNMP responses triggered by the NMS's "SET" request.

Figure 11:
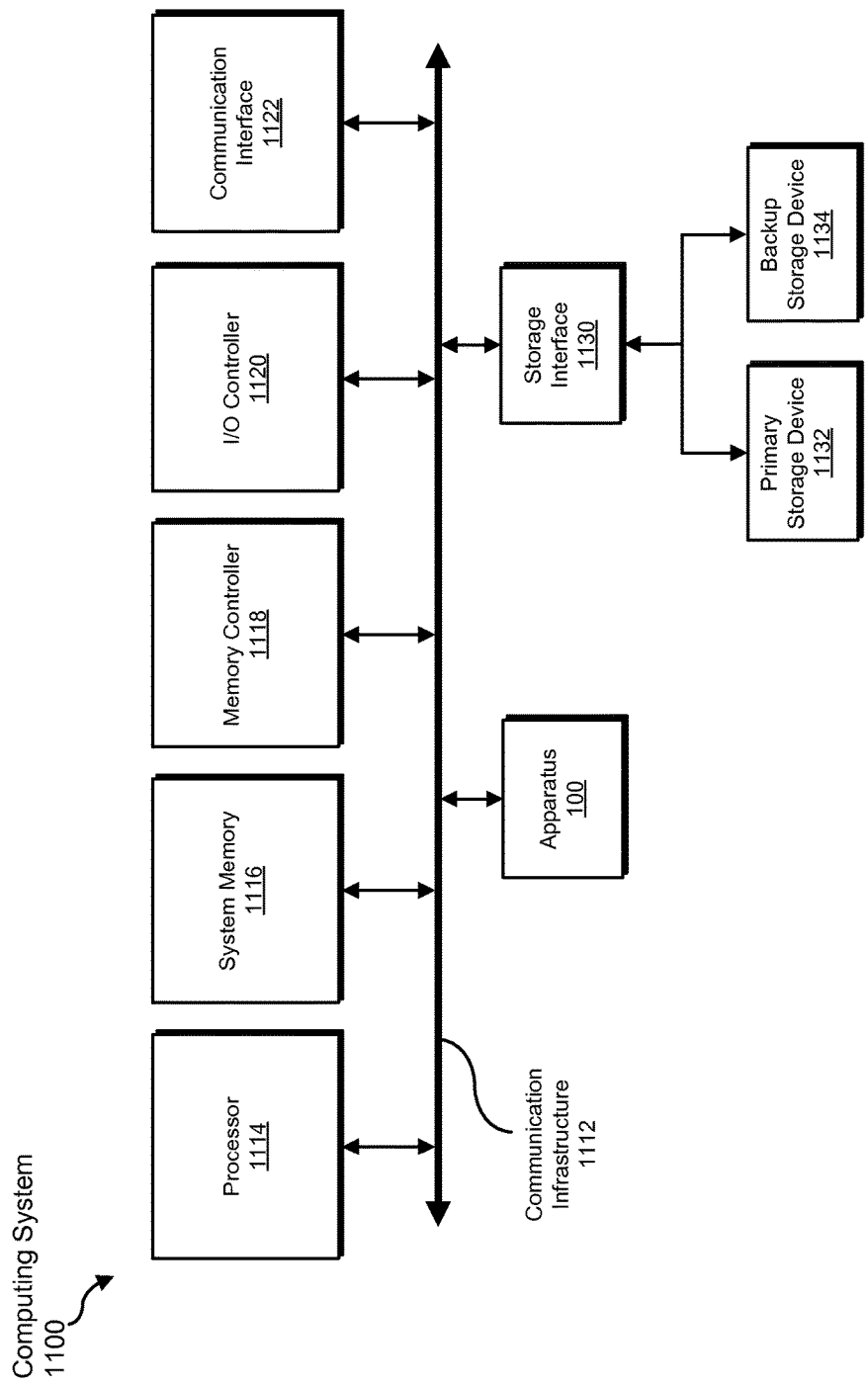
FIG. 11 is a block diagram of an exemplary computing system capable of implementing and/or being used in connection with one or more of the embodiments described and/or illustrated herein.

FIG. 11 is a block diagram of an exemplary computing system 1100 capable of implementing and/or being used in connection with one or more of the embodiments described and/or illustrated herein. In some embodiments, all or a portion of computing system 1100 may perform and/or be a means for performing, either alone or in combination with other elements, one or more of the steps described in connection with FIG. 6. All or a portion of computing system 1100 may also perform and/or be a means for performing and/or implementing any other steps, methods, or processes described and/or illustrated herein. In one example, computing system 1100 may include apparatus 100 from FIG. 1.

Computing system 1100 broadly represents any type or form of electrical load, including a single or multi-processor computing device or system capable of executing computer-readable instructions. Examples of computing system 1100 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 1100 may be programmed, configured, and/or otherwise designed to comply with one or more networking protocols. According to certain embodiments, computing system 1100 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 1100 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 1100 may include various network and/or computing components. For example, computing system 1100 may include at least one processor 1114 and a system memory 1116. Processor 1114 generally represents any type or form of processing unit capable of processing data or interpreting and executing instructions. For example, processor 1114 may represent an application-specific integrated circuit (ASIC), a system on a chip (e.g., a network processor), a hardware accelerator, a general purpose processor, and/or any other suitable processing element.

Processor 1114 may process data according to one or more of the networking protocols discussed above. For example, processor 1114 may execute or implement a portion of a protocol stack, may process packets, may perform memory operations (e.g., queuing packets for later processing), may execute end-user applications, and/or may perform any other processing tasks.

System memory 1116 generally represents any type or form of volatile or non-volatile storage device or medium capable of storing data and/or other computer-readable instructions. Examples of system memory 1116 include, without limitation, Random Access Memory (RAM), Read Only Memory (ROM), flash memory, or any other suitable memory device. Although not required, in certain embodiments computing system 1100 may include both a volatile memory unit (such as, for example, system memory 1116) and a non-volatile storage device (such as, for example, primary storage device 1132, as described in detail below). System memory 1116 may be implemented as shared memory and/or distributed memory in a network device. Furthermore, system memory 1116 may store packets and/or other information used in networking operations.

In certain embodiments, exemplary computing system 1100 may also include one or more components or elements in addition to processor 1114 and system memory 1116. For example, as illustrated in FIG. 11, computing system 1100 may include a memory controller 1118, an Input/Output (I/O) controller 1120, and a communication interface 1122, each of which may be interconnected via communication infrastructure 1112. Communication infrastructure 1112 generally represents any type or form of infrastructure capable of facilitating communication between one or more components of a computing device. Examples of communication infrastructure 1112 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 1118 generally represents any type or form of device capable of handling memory or data or controlling communication between one or more components of computing system 1100. For example, in certain embodiments memory controller 1118 may control communication between processor 1114, system memory 1116, and I/O controller 1120 via communication infrastructure 1112. In some embodiments, memory controller 1118 may include a Direct Memory Access (DMA) unit that may transfer data (e.g., packets) to or from a link adapter.

I/O controller 1120 generally represents any type or form of device or module capable of coordinating and/or controlling the input and output functions of a computing device. For example, in certain embodiments I/O controller 1120 may control or facilitate transfer of data between one or more elements of computing system 1100, such as processor 1114, system memory 1116, communication interface 1122, and storage interface 1130.

Communication interface 1122 broadly represents any type or form of communication device or adapter capable of facilitating communication between exemplary computing system 1100 and one or more additional devices. For example, in certain embodiments communication interface 1122 may facilitate communication between computing system 1100 and a private or public network including additional computing systems. Examples of communication interface 1122 include, without limitation, a link adapter, a wired network interface (such as a network interface card), a wireless network interface (such as a wireless network interface card), and any other suitable interface. In at least one embodiment, communication interface 1122 may provide a direct connection to a remote server via a direct link to a network, such as the Internet. Communication interface 1122 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 1122 may also represent a host adapter configured to facilitate communication between computing system 1100 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 1122 may also enable computing system 1100 to engage in distributed or remote computing. For example, communication interface 1122 may receive instructions from a remote device or send instructions to a remote device for execution.

As illustrated in FIG. 11, exemplary computing system 1100 may also include a primary storage device 1132 and/or a backup storage device 1134 coupled to communication infrastructure 1112 via a storage interface 1130. Storage devices 1132 and 1134 generally represent any type or form of storage device or medium capable of storing data and/or other computer-readable instructions. For example, storage devices 1132 and 1134 may represent a magnetic disk drive (e.g., a so-called hard drive), a solid state drive, a floppy disk drive, a magnetic tape drive, an optical disk drive, a flash drive, or the like. Storage interface 1130 generally represents any type or form of interface or device for transferring data between storage devices 1132 and 1134 and other components of computing system 1100.

In certain embodiments, storage devices 1132 and 1134 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1132 and 1134 may also include other similar structures or devices for allowing computer software, data, or other computer-readable instructions to be loaded into computing system 1100. For example, storage devices 1132 and 1134 may be configured to read and write software, data, or other computer-readable information. Storage devices 1132 and 1134 may be a part of computing system 1100 or may be separate devices accessed through other interface systems.

Many other devices or subsystems may be connected to computing system 1100. Conversely, all of the components and devices illustrated in FIG. 11 need not be present to practice the embodiments described and/or illustrated herein. The devices and subsystems referenced above may also be interconnected in different ways from those shown in FIG. 11. Computing system 1100 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of apparatus 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. For example, one or more of the modules recited herein may receive management data to be transformed, transform the management data, output a result of the transformation to send to an NMS, use the result of the transformation for processing and/or consumption by an application running on the NMS, and store the result of the transformation for future use and/or reference. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. An apparatus comprising:
a database that stores objects as management data; and
a physical processing device having access to the database, wherein the physical processing device:
receives, from a Network Management Station (NMS) included in a network, a set request to create a subtree of certain objects of interest to the NMS;
in response to receiving the set request from the NMS:
identifies, based at least in part on the set request, Object IDentifiers (OIDs) for the certain objects of interest to the NMS that initiated the set request;
creates a table entry within a Management Information Base (MIB) tree included in the database; and
stores, as a subtree in the table entry within the MIB tree, the OIDs for the certain objects of interest to the NMS;
maintains the OIDs included in the subtree in a non-lexicographical order;
receives, from the NMS, a get request for the certain objects of interest to the NMS;
in response to receiving the get request from the NMS:
identifies, within the get request, an OID for a root object of the subtree stored in the table entry within the MIB tree; and
provides, based at least in part on the OID for the root object, all the certain objects whose OIDs are stored as the subtree in the table entry to the NMS that initiated the get request in the non-lexicographical order.

2. The apparatus of claim 1, wherein:
the set request includes an OID for at least a portion of the subtree; and
the physical processing device searches the database for the subtree by using the OID as a database key.

3. The apparatus of claim 2, wherein the physical processing device identifies the subtree by identifying, at a specific location within the database identified by the OID, the certain objects of interest to the NMS.

4. The apparatus of claim 1, wherein the physical processing device retrieves, from the table entry within the MIB tree, all the certain objects whose OIDs are stored as the subtree.

5. The apparatus of claim 1, wherein the subtree further comprises all the certain objects of interest to the NMS.

6. The apparatus of claim 1, wherein the physical processing device:

populates, in response to receiving the set request, the table entry with the subtree in connection with a polling operation performed by the NMS; and
receives another set request from another NMS to populate another table entry within the MIB tree with another subtree in connection with another polling operation performed by the other NMS.

7. The apparatus of claim 1, wherein the physical processing device provides all the certain objects whose OIDs are stored as the subtree by:
in response to the get request:
generating a plurality of responses that each contain at least one of the certain objects whose OIDs are stored as the subtree; and
sending the plurality of responses to the NMS.

8. The apparatus of claim 1, wherein the physical processing device:
updates the subtree by adding an OID for an additional object of interest to the subtree during a polling operation; and
provides, during the polling operation, the additional object of interest to the NMS in connection with the get request received from the NMS without necessitating another get request that includes the OID for the additional object of interest added to the subtree.

9. A router comprising:
a Management Information Base (MIB) tree that stores objects as management data; and
a physical processing device having access to the MIB tree, wherein the physical processing device:
receives, from an NMS included in a network, a set request to create a subtree of certain objects of interest to the NMS;
in response to receiving the set request from the NMS:
identifies, based at least in part on the set request, Object IDentifiers (OIDs) for the certain objects of interest to the NMS that initiated the set request;
creates a table entry within the MIB tree; and
stores, as a subtree in the table entry within the MIB tree, the OIDs for the certain objects of interest to the NMS;
maintains the OIDs included in the subtree in a non-lexicographical order;
receives, from the NMS, a get request for the certain objects of interest to the NMS;
in response to receiving the get request from the NMS:
identifies, within the get request, an OID for a root object of the subtree stored in the table entry within the MIB tree; and
provides, based at least in part on the OID for the root object, all the certain objects whose OIDs are stored as the subtree in the table entry to the NMS that initiated the get request in the non-lexicographical order.

10. The router of claim 9, wherein:
the set request includes an OID for at least a portion of the subtree; and
the physical processing device searches the MIB tree for the subtree by using the OID as a key.

11. The router of claim 10, wherein the physical processing device identifies the subtree by locating, at a specific location within the MIB tree identified by the OID, the certain objects of interest to the NMS.

12. The router of claim 9, wherein the physical processing device retrieves, from the table entry within the MIB tree, all the certain objects whose OIDs are stored as the subtree.

13. The router of claim 12, wherein the subtree further comprises all the certain objects of interest to the NMS.

14. The router of claim 9, wherein the physical processing device:
populates, in response to receiving the set request, the table entry with the subtree in connection with a polling operation performed by the NMS; and
receives another set request from another NMS to populate another table entry within the MIB tree with another subtree in connection with another polling operation performed by the other NMS.

15. The router of claim 9, wherein the physical processing device provides all the certain objects whose OIDs are stored as the subtree by:
in response to the get request:
generating a plurality of responses that each contain at least one of the certain objects whose OIDs are stored as the subtree; and
sending the plurality of responses to the NMS.

16. The router of claim 9, wherein the physical processing device:
updates the subtree by adding an OID for an additional object of interest to the subtree during a polling operation; and
provides, during the polling operation, the additional object of interest to the NMS in connection with the get request received from the NMS without necessitating another get request that includes the OID for the additional object of interest added to the subtree.

17. A method comprising:
receiving, from a Network Management Station (NMS) included in a network, a set request to create a subtree of certain objects of interest to the NMS;
in response to receiving the set request from the NMS:
identifying, based at least in part on the set request, Object Identifiers (OIDs) for the certain objects of interest to the NMS that initiated the set request;
creating a table entry within a Management Information Base (MIB) tree;
and storing, as a subtree in the table entry within the MIB tree, the OIDs for the certain objects of interest to the NMS;
maintaining the OIDs included in the subtree in a non-lexicographical order;
receiving, from the NMS, a get request for the certain objects of interest to the NMS;
in response to receiving the get request from the NMS:
identifying, within the get request, an OID for a root object of the subtree stored in the table entry within the MIB tree; and
providing, based at least in part on the OID for the root object, all the certain objects whose OIDs are stored as the subtree in the table entry to the NMS that initiated the get request in the non-lexicographical order.

* * * * *